(12) United States Patent
Ding et al.

(10) Patent No.: US 11,658,989 B1
(45) Date of Patent: May 23, 2023

(54) METHOD AND DEVICE FOR IDENTIFYING UNKNOWN TRAFFIC DATA BASED DYNAMIC NETWORK ENVIRONMENT

(71) Applicant: National University of Defense Technology, Hunan (CN)

(72) Inventors: Zhaoyun Ding, Hunan (CN); Hang Zhang, Hunan (CN); Deqi Cao, Hunan (CN); Weike Liu, Hunan (CN); Yi Liu, Hunan (CN); Xianqiang Zhu, Hunan (CN); Cheng Zhu, Hunan (CN); Yun Zhou, Hunan (CN); Songping Huang, Hunan (CN); Bin Liu, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/953,665

(22) Filed: Sep. 27, 2022

(30) Foreign Application Priority Data

Jan. 13, 2022 (CN) .......................... 202210036819.8

(51) Int. Cl.
*H04L 9/40* (2022.01)
*G06N 5/022* (2023.01)

(52) U.S. Cl.
CPC ......... *H04L 63/1416* (2013.01); *G06N 5/022* (2013.01)

(58) Field of Classification Search
CPC .............................................. H04L 63/1416

USPC ........................................................... 726/23
See application file for complete search history.

(56) References Cited

U.S. PATENT DOCUMENTS

| | | | |
|---|---|---|---|
| 8,797,901 B2* | 8/2014 | Ji .......................... | H04L 45/38 |
| | | | 370/252 |
| 11,232,280 B2* | 1/2022 | Mabyalaht ............... | G06N 3/04 |
| 11,302,114 B2* | 4/2022 | Csillag .................... | G06V 20/54 |
| 11,438,356 B2* | 9/2022 | Sern ....................... | H04L 63/1416 |
| 11,509,667 B2* | 11/2022 | Hines ..................... | H04L 63/14 |
| 11,539,719 B2* | 12/2022 | Chopra .................. | G06F 8/63 |
| 2022/0398456 A1* | 12/2022 | Gao ....................... | G06V 10/82 |

* cited by examiner

*Primary Examiner* — Badrinarayanan
(74) *Attorney, Agent, or Firm* — Dragon Sun Law Firm, PC; Nathaniel Perkins

(57) ABSTRACT

The disclosure relates to a method and device for identifying unknown traffic data based on a dynamic network environment. The method includes following steps. The known traffic in the network data is classified by using the known network traffic classification model, then the preliminary determination is performed according to a classification prediction result, network data preliminarily determined as the unknown traffic data is classified by using the adaptive clustering method, and then respective classes are identified by using a similarity coefficient estimation method so as to identify the classes of the malicious traffic and the normal traffic, that is, to further identify and learn the unknown traffic data, and transform it into known traffic data, and then the known network traffic classification model is trained and updated again with the new known traffic data.

9 Claims, 5 Drawing Sheets

METHOD AND DEVICE FOR IDENTIFYING UNKNOWN TRAFFIC DATA BASED DYNAMIC NETWORK ENVIRONMENT

CROSS-REFERENCE TO RELATED APPLICATIONS

This application claims priority from the Chinese patent application 202210036819.8 filed Jan. 13, 2022, the content of which are incorporated herein in the entirety by reference.

TECHNICAL FIELD

The disclosure relates to a technical field of network data identification, in particular to a method and device for identifying unknown traffic data based on a dynamic network environment.

BACKGROUND

In recent years, with rapid development of the Internet, network traffic is experiencing explosive growth, and Internet access traffic has been growing rapidly. However, the rapid development has posed great challenges to network security. With growth of the network traffic, unknown traffic is mixed in data stream of the network traffic, and there may be malicious traffic in the unknown traffic, which brings a huge threat to users' network security, and its hidden dangers should not be underestimated. Therefore, identification and analysis of the unknown traffic, especially unknown malicious traffic, has become an important research topic. In existing identification schemes, port-based traffic identification technology, machine learning-based traffic identification technology or deep learning-based traffic identification technology is adopted. For a closed world issue, high accuracy of traffic classification can be achieved in existing research methods. However, in a real world, data of network applications is numerous and is constantly updated with development of the network. With new applications unknown to existing models and whenever new applications emerge, accuracy of the existing models may be greatly affected, resulting in a decline in the identification efficiency of the unknown traffic and even a threat to the network security.

SUMMARY

On this basis, it is necessary to provide a method and device for identifying unknown traffic data based on a dynamic network environment, which can deal with a rapid dynamically updating speed of the network environment nowadays and can effectively identify the unknown traffic data.

A method for identifying unknown traffic data based on a dynamic network environment includes:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions;

inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data;

classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data; and training and updating the known network traffic classification model with malicious traffic data and normal traffic data identified in the unknown traffic data as known traffic data.

In an embodiment, acquiring a known traffic data training set, the known traffic data training set including known normal traffic data, known malicious traffic data and mixed traffic data of known normal traffic data and known malicious traffic data; and pre-processing respective known traffic training data and inputting it into the known network traffic classification model respectively for training until it has ability to classify the known traffic data, the known network traffic classification model including three traffic classification subnetworks which are trained with the known normal traffic data, the known malicious traffic data and the mixed traffic data, respectively.

In an embodiment, each of the traffic classification subnetworks includes a one-dimensional depth neural network, a two-dimensional depth neural network, a three-dimensional depth neural network and a decision information fusion layer;

the known traffic training data is pre-processed to obtain one-dimensional vector data, two-dimensional vector data and three-dimensional vector data corresponding to the respective known traffic training data; and in training respective traffic classification subnetworks, the one-dimensional vector data, the two-dimensional vector data and the three-dimensional vector data corresponding to the known traffic training data are input into the one-dimensional depth neural network, the two-dimensional depth neural network and the three-dimensional depth neural network correspondingly for feature extraction, and respectively extracted features are input into the decision information fusion layer for fusion, and then the class prediction result of the known traffic training data is output.

In an embodiment, the one-dimensional depth neural network, the two-dimensional depth neural network and the three-dimensional depth neural network each includes two continuous convolution layers for feature extraction and a ReLU function behind each of the convolution layers; and the decision information fusion layer includes a fully connected layer and a Softmax layer connected in sequence.

In an embodiment, performing the preliminary determination for unknown traffic data on the traffic data corresponding to the class prediction result according to the self-adaptive confidence principle to obtain the unknown traffic data includes:

determining that the traffic data corresponding to the class prediction result is the unknown traffic data if the class prediction result is less than a confidence threshold;

determining that the traffic data corresponding to the class prediction result is the known traffic data if the class prediction result is greater than the confidence threshold; and determining a preset number of traffic data with a lowest class prediction result as the unknown traffic data when traffic data in the network traffic data set a number of which exceeds the preset number is preliminarily determined as unknown traffic data.

In an embodiment, in performing the preliminary determination for unknown traffic data according to the class prediction result and the confidence threshold, an initial value of the adaptive confidence threshold is a preset value, and when traffic data in the network traffic data a number of which is less than the preset number is preliminarily determined as unknown traffic data, the preset value is increased by a factor of (1+a), where a is a preset parameter.

In an embodiment, classifying the unknown traffic data into different classes according to an adaptive clustering method, and initially labeling the unknown traffic data according to the divided classes includes:

performing feature dimension reduction on the unknown traffic data using a principle component analysis method; and clustering the unknown traffic data after the dimension reduction to obtain a class label of the unknown traffic data.

In an embodiment, in identifying the class of the unknown traffic data according to the similarity coefficient estimation method to obtain classes for malicious traffic and normal traffic in the unknown traffic data, similarity of the traffic data is estimated by calculating K-L divergence indexes of two types of traffic data features.

In an embodiment, the method for identifying unknown traffic data according to claim 1 is characterized in that pre-processing of the data based on the traffic feature ordering is made using four processing methods: a sequential method, a random sampling method, a load descending method and a load ascending method.

A device for identifying unknown traffic data based on a dynamic network environment includes a network traffic data set acquisition module, a network traffic data set preprocessing module, a known traffic data class prediction module, an unknown traffic data preliminary determination module, an unknown traffic data class labeling module, a malicious traffic class identification module and a known-network-traffic-classification model training and updating module.

The network traffic data set acquisition module is configured for acquiring a network traffic data set to be identified, the network traffic data set includes a plurality of known traffic data and/or unknown traffic data, both the known traffic data and the unknown traffic data contain normal traffic data and malicious traffic data.

The network traffic data set pre-processing module is configured for pre-processing the network traffic data set based on traffic feature ordering to obtain traffic data features in multiple dimensions.

The known traffic data class prediction module is configured for inputting the traffic data features in the multiple dimensions into a known network traffic classification model to predict a class of respective traffic data in the network traffic data set, and outputting respective class prediction result.

The unknown traffic data preliminary determination module is configured for performing preliminary determination for unknown traffic data on traffic data corresponding to the class prediction result according to a self-adaptive confidence principle to obtain the unknown traffic data.

The unknown traffic data class labeling module is configured for classifying the unknown traffic data into different classes according to an adaptive clustering method, and initially labeling the unknown traffic data according to the divided classes.

The malicious traffic class identification module is configured for identifying a class of the unknown traffic data according to a similarity coefficient estimation method to obtain classes for malicious traffic and normal traffic in the unknown traffic data.

The known-network-traffic-classification model training and updating module is configured for training and updating the known network traffic classification model with malicious traffic data and normal traffic data identified in the unknown traffic data as known traffic data.

A computer device includes a memory and a processor. The memory stores a computer program, and the processor executes the computer program to realize following steps:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions;

inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data;

classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data; and training and updating the known network traffic classification model with malicious traffic data and normal traffic data identified in the unknown traffic data as known traffic data.

A computer-readable storage medium having a computer program stored thereon is provided. Following steps are implemented when the program is executed by a processor:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions;

inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data;

classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data; and training and updating the known network traffic classification model with malicious traffic data and normal traffic data identified in the unknown traffic data as known traffic data. In the method and device for identifying unknown traffic data based on the dynamic network environment, the known traffic in the network data is classified by using the known network traffic classification model, then the preliminary determination is performed according to a classification prediction result, network data preliminarily determined as the unknown traffic data is classified by using the adaptive clustering method, and then respective classes are identified by using the similarity coefficient estimation method so as to identify the classes of the malicious traffic and the normal traffic, that is, to further identify and learn the unknown traffic data, and transform it into known traffic data, and then the known network traffic classification model is trained and updated again with the new known traffic data, so that the known network traffic classification model should learn and be trained with the emerging new network data in practical application, so that it has ability to identify more network traffic data and continuously improves ability to identify unknown traffic data, which is suitable for the dynamic network environment with rapid changes nowadays.

BRIEF DESCRIPTION OF THE DRAWINGS

FIG. 3A is a schematic diagram of two-dimensional data visualization and FIG. 3B is a schematic diagram of three-dimensional data visualization according to an embodiment;

DETAILED DESCRIPTION

In order to make the objects, technical schemes and advantages of the present disclosure clearer, the present disclosure will be further described in detail with reference to the drawings and examples. It should be understood that the specific embodiments described herein are only used to explain the present disclosure, and are not intended to limit the present disclosure.

In a real network world, data of network applications is numerous and is constantly updated with development of the network. With new applications unknown to existing models and whenever new applications emerge which indicates that new unknown traffic data emerges, accuracy of the existing models may be greatly affected, resulting in a decline in the identification efficiency of the unknown traffic data, and causing some of unknown traffic data that have not been identified to threaten network security.

Figure 1:
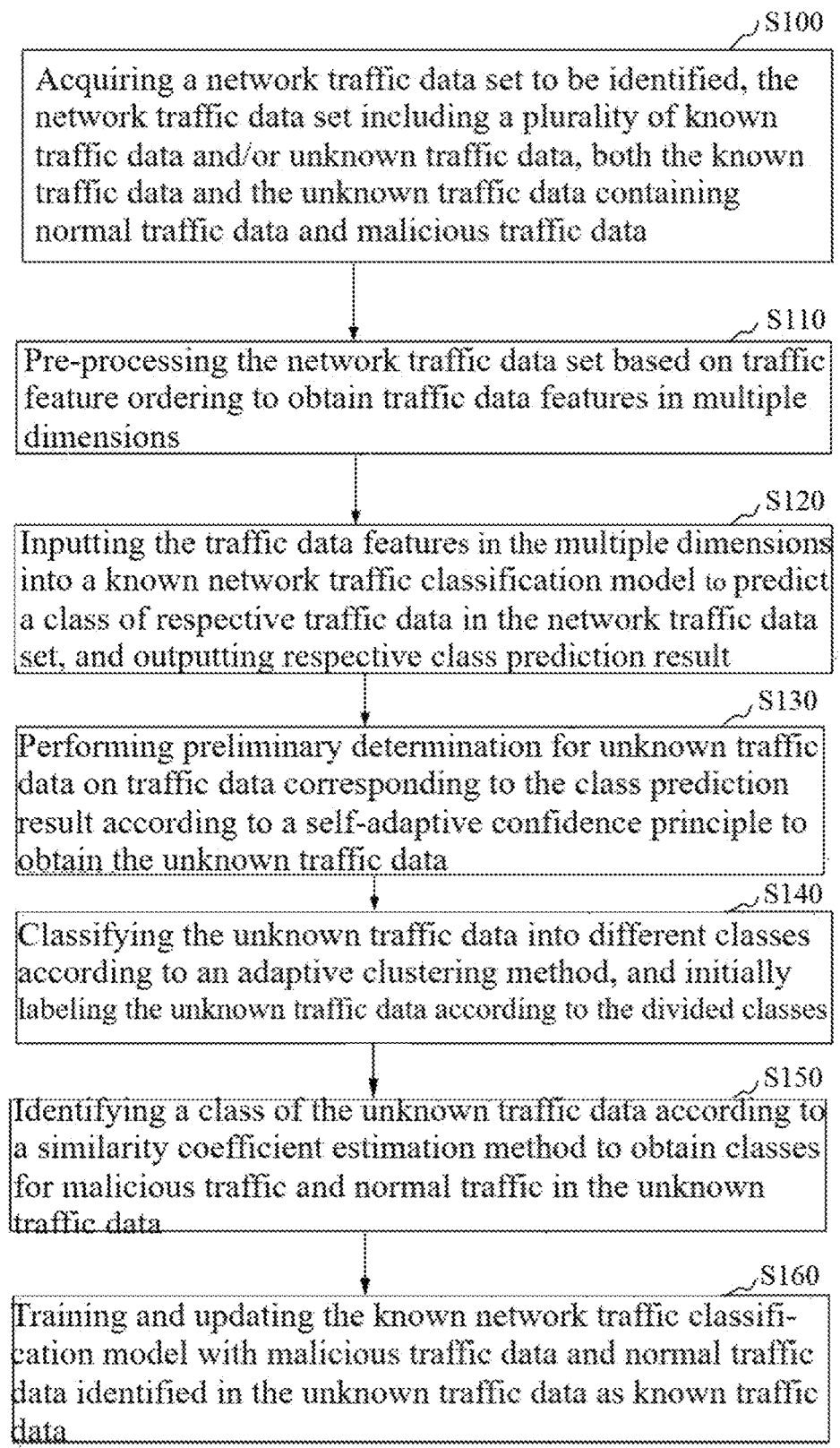
FIG. 1 is a flowchart of a method for identifying unknown traffic data according to an embodiment.

To solve above problems, as shown in FIG. 1, a method for identifying unknown traffic data based on a dynamic network environment is provided, and the method specifically include following steps.

In step S100, a network traffic data set to be identified is acquired, the network traffic data set includes a plurality of known traffic data and/or unknown traffic data, and both the known traffic data and the unknown traffic data contain normal traffic data and malicious traffic data.

In step S110, the network traffic data set is pre-processed based on traffic feature ordering to obtain traffic data features in multiple dimensions.

In step S120, the traffic data features in the multiple dimensions is input into a known network traffic classification model to predict a class of respective traffic data in the network traffic data set, and respective class prediction result is output.

In step S130, preliminary determination for unknown traffic data is performed on traffic data corresponding to the class prediction result according to a self-adaptive confidence principle to obtain the unknown traffic data.

In step S140, the unknown traffic data is classified into different classes according to an adaptive clustering method, and the unknown traffic data is initially labeled according to the divided classes.

In step S150, a class of the unknown traffic data is identified according to a similarity coefficient estimation method to obtain classes for malicious traffic and normal traffic in the unknown traffic data.

In step S160, the known network traffic classification model is trained and updated with malicious traffic data and normal traffic data identified in the unknown traffic data as known traffic data.

In order to solve above problems, in, this method, the identified unknown traffic data is labeled adaptively with a clustering method, and then the malicious traffic in the unknown traffic is identified with the similarity coefficient estimation method. With this cognitive process, the unknown traffic data is transformed into known traffic data. After this, it is used as new training data to update the known network traffic classification model, so that the known network traffic classification model can not only identify normal and malicious traffic data of a known class, but also identify, label and utilize new normal and malicious network traffic data. The model proposed in this method can continuously identify and label new unknown traffic data in the network, and always identify the unknown traffic efficiently and accurately in a dynamic evolving actual network environment.

In step S100, the network traffic data set can be various kinds of traffic data acquired on the network for a period of time and needed to be identified. Due to limitations of acquiring means of the network traffic data, and continuous updating of network applications and malicious attack methods in the real world, unknown normal traffic data and unknown malicious traffic data that are not included in the historical acquired data may emerge in the data to be identified. Therefore, in this method, a classification model for the known normal and malicious traffic data acquired in history is established, and unknown normal traffic data and unknown malicious traffic data are discriminated and determined from the traffic data to be identified based on confidence of prediction results of the classification model.

In step S110, a pre-processing process based on traffic feature ordering is adopted to obtain traffic data features in multiple dimensions. Because a protocol packet in TCP/UDP for network traffic contains a lot of traffic payloads, deep packet inspection data of the network traffic data is adopted in this method, that is, all of data in a whole packet of the network traffic. Generally, traffic data of a network application contains network traffic data of different protocols and lengths. In order to find most representative traffic data from massive traffic data of the network application as traffic features, there are four traffic feature pre-processing strategies based on traffic feature ordering namely, a sequential strategy, a random sampling strategy, a load descending strategy and a load ascending strategy. The network traffic data is converted into one-dimensional vector data, two-dimensional vector data and three-dimensional vector data, and the known network traffic classification model is iteratively trained to have ability to classify the known traffic data.

Figure 2:
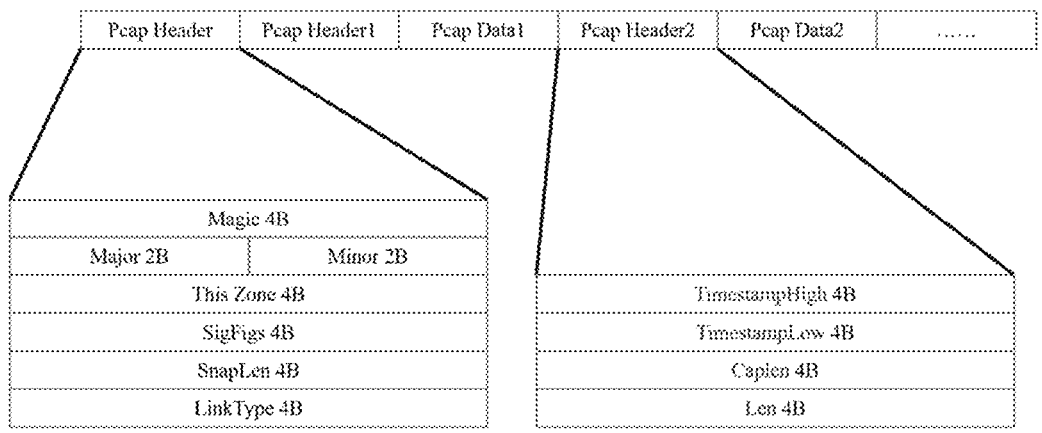
FIG. 2 is a structure diagram of a pcap file according to an embodiment.

Specifically, the network traffic data used in this method is stored in a pcap format, which is a general network traffic data format. A basic structure of data is shown in FIG. 2. A pcap file consists of a pacp header, m packet headers and packet data, where m is a number of packets contained in the pcap file.

There are 24 bytes in the pacp header, including following main contents: Magic (4 Byte) which marks beginning of the file and is used to identify the file itself and a byte order; Major(2 Byte) which indicates a'major current version number of the file; Minor(2 Byte) which indicates a minor current version number of the file; ThisZone(4 Byte) which indicates local standard time, is all zero if GMT is used, and is generally written as 0000 0000 directly; SigFigs(4 Byte) which indicates accuracy of timestamp; SnapLen(4 Byte) which indicates a maximum storage length; and LinkType(4 Byte) which indicates a link type.

The packet header has 16 bytes, including following main contents: TimestampHigh (4 bytes) which indicates the higher bits of captured time, with precision of seconds; TimestampLow (4 bytes) which indicates lower bits of the captured time, with precision of milliseconds; Caplen(4 Byte) which indicates a length of a current data area, that is, a length of a captured data frame, excluding the length of the packet header itself, with an unit of Byte, from which a position of a next data frame can be obtained; Len(4 Byte) which indicates an offline data length, that is, a length of the actual data frame in the network, which is generally not greater than a length of the current data area (Caplen) and is equal to Caplen in most cases. The packet data is after the packet header, a data length is Caplen Bytes, which follows by a new packet header, new packet data, and so on.

Figure 4:
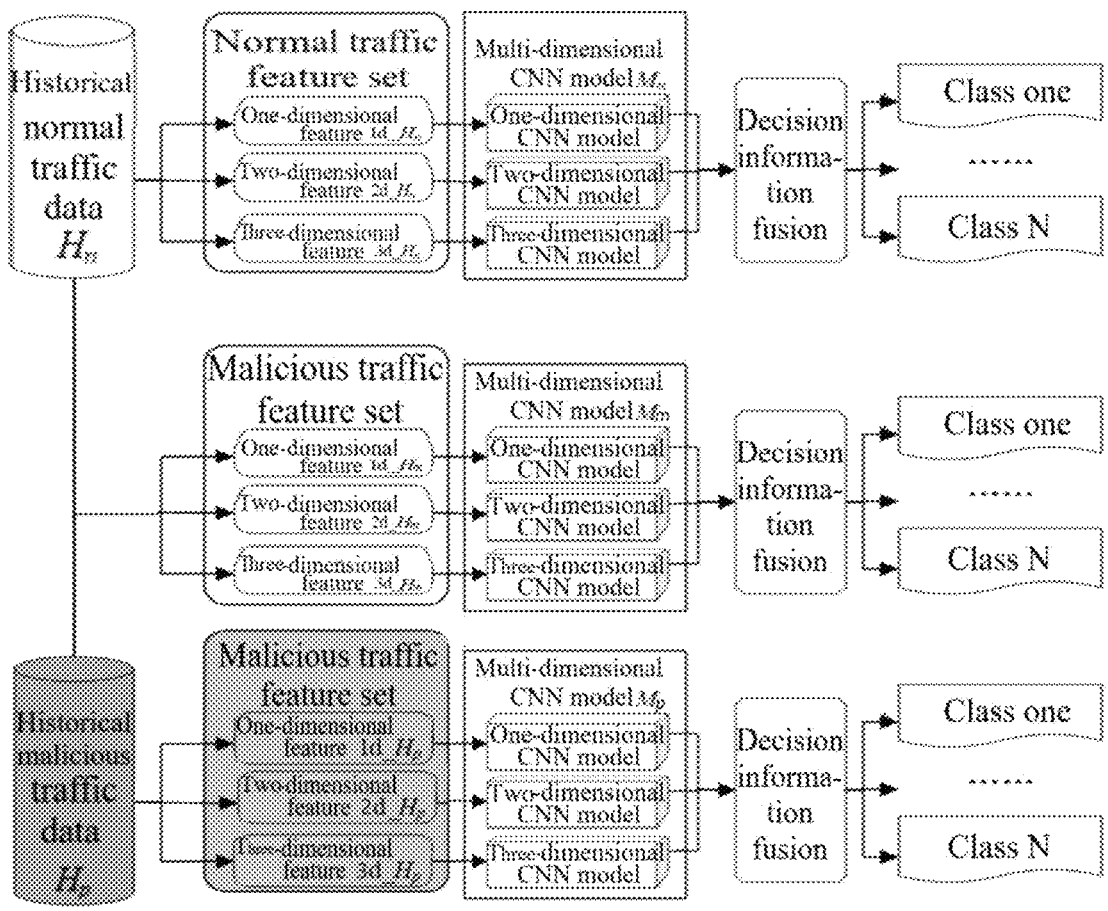
FIG. 4 is a schematic diagram of a known traffic classification model according to an embodiment.

In this embodiment, training the known network traffic classification model before using the known network traffic classification model to predict the class of the respective traffic data in the network traffic data set includes: acquiring a known traffic data training set, the known traffic data training set including known normal traffic data, known malicious traffic data and mixed traffic data of known normal traffic data and known malicious traffic data, and pre-processing respective known traffic training data and inputting it into the known network traffic classification model respectively for training until it has ability to classify the known traffic data, the known network traffic classification model including three traffic classification subnetworks which are trained with the known normal traffic data, the known malicious traffic data and the mixed traffic data respectively. A structure of the known network traffic classification model is shown in FIG. 4.

It should be noted here that in training the known network traffic classification model and inputting the network data to the trained known network traffic classification model, the above-described traffic feature ordering method is adopted for pre-processing the network data.

Because the network traffic data is usually massive in scale and a number of traffic data of different types of network traffic data is also different, in this method, an equal number of training samples are selected from each of the network traffic data packets so as to improve quality of the known traffic classification model. The historically acquired known normal network traffic packets are defined as $H_n = \{h_n^1, \ldots, h_n^K\}$, and there are K different known network traffic classes; and known malicious network traffic packets are $H_p = \{h_p^1, \ldots, h_p^L\}$, and there are L different known malicious network traffic classes. For each of the network traffic classes, num_sample samples are selected as training data, and in this method, num_sample is usually set to be 5000. In a pre-processing process of an algorithm, every 8 bytes of the network traffic are converted into one decimal positive integer (with a range of values from 0 to 255). In this method, a feature vector length of the network traffic feature_length is set to be 1521, a size of a one-dimensional feature vector is 1×1521, a size of a two-dimensional feature vector is 39×39, and a size of a three-dimensional feature vector is 22×22×3.

In this embodiment, pseudo codes for pre-processing the traffic data are also provided as follows.

Input: known network traffic $H_n$ and $H_p$, the number of samples num_sample, the feature vector length feature_length, feature ordering pre-processing strategy currently adopted strategy Output: one-dimensional, two-dimensional and three-dimensional known normal and malicious network traffic feature vector sets 1d_$H_n$, 2d_$H_n$, 3d_$H_n$, 1d_$H_p$, 2d_$H_p$, and 3d_$H_p$.

1. for h in $H_n \cup H_p$: #for packets of all traffic classes
2. Read the traffic packet h in pcap format.
3. Skip the first 24 bytes of the pcap header
4. Create empty sample traffic data $\bar{h} \leftarrow \emptyset$
5. while there are still unread traffic samples in h:
6. Read 16 bytes of the packet header to obtain the packet length Caplen
7. Read Caplen bytes to obtain sample traffic p
8. $\bar{h} \leftarrow p$, the sample traffic is stored
9. end while
10. According to the strategy strategy, the sample traffic data set $\bar{h}$ is ordered.
11. Select the top num_sample samples in $\bar{h}$, and select all of the samples if it is insufficient.
12. while there are still unread traffic samples in $\bar{h}$:
13. Obtain sample traffic p, and a sample length length(p)
14. if length(p)≥feature_length:
15. Read top feature_length bytes in the sample p
16. else:
17. add feature_length−length(p) zero features to p
18. end while
19. $\bar{h}$=1d_h, the one-dimensional feature vector is obtained.
20. transform $\bar{h}$ into the 39×39 two-dimensional vector 2d_h
21. Intercept and transform h into the 22×22×3 three-dimensional vector 3 d_h 22. store the obtained 1_d_h, 2_d_h, and 3_d_h in corresponding feature vector sets.

23. Return 1d_$H_n$, 2d_$H_p$, 3d_$H_p$, 1d_$H_p$, 2d_$H_p$, and 3d_$H_p$

In this method, in reading the pcap packet, the 24 bytes of the header are ignored, and only the payload is concerned. For each type of network traffic data, the first 24 bytes of the pcap header are skipped, then a length of each piece of traffic data can be obtained by reading each 16-byte packet header, and each piece of traffic data in the pcap packet is stored to get an initial feature set $\bar{h}$ containing only the traffic data.

After that, the initial feature set $\bar{h}$ of the whole traffic packet is ordered according to the feature ordering pre-processing strategy. In this method, there are four strategies, namely, a sequential strategy (Strategy_sequential), a random sampling strategy (Strategy_random), load a descending strategy (Strategy_descending) and a load ascending strategy (Strategy_ascending). The sequential strategy keeps a transmission sequence of original traffic data, and does not perform additional ordering operations on the initial feature set $\bar{h}$. In the random sampling strategy, all the traffic data in the $\bar{h}$ is randomly reordered to evenly obtains the traffic features of different protocols and lengths in the packets; in the load descending strategy, the traffic data in the initial feature set $\bar{h}$ is ordered according to a length from long to short, and this method focuses on extracting traffic data with long load from a type of network traffic data; the load ascending strategy, the traffic data in the initial feature set $\bar{h}$ is ordered according to a length from short to long, and this method focuses on extracting a type of network traffic data with short load, which is usually broadcast traffic data or traffic data of a transmission control protocol. A method with highest model accuracy in the actual feature ordering pre-processing obtained by training is selected as a general method of data pre-processing.

After the initial feature set $\bar{h}$ is ordered by the feature ordering-based pre-processing strategy, the top num_sample samples in $\bar{h}$ are selected as training data of a type of network traffic for the known traffic classification model, and then feature vector lengths of all of the samples in $\bar{h}$ are processed, that is, if the length of traffic data is greater than the preset feature_length, redundant bytes are deleted, and if it is insufficient, insufficient bytes are filled with zeros. After that, the one-dimensional feature vector is transformed into the two-dimensional feature vector and the three-dimensional feature vector, which are used to train depth neural network models with different dimensions. FIG. 3 is a result with the two-dimensional feature vector (39×39) being visualized as a grayscale image.

In the pre-processing process, the known normal traffic data $H_n=\{h_n^1, \ldots, h_n^K\}$ and known malicious traffic data $H_p=\{h_p^1, \ldots, h_p^L\}$ are input to obtain their corresponding one-dimensional, two-dimensional and three-dimensional feature vector sets F_$H_n$={1d_$H_n$, 2d_$H_n$, 3d_$H_n$}, and obtain the feature vector sets F_$H_p$={1d_$H_p$, 2d_$H_p$, 3d_$H_p$} of the known malicious traffic. Four feature ordering strategies are used to pre-process the features respectively, to obtain the traffic data features under the four strategies.

After pre-processing, pcap network traffic packets are all converted into one-dimensional, two-dimensional and three-dimensional vectors with a same length, and these three types of vectors are used as an input to the next known network traffic classification model to train the prediction model.

It should be explained here that when the known network traffic classification model is actually used to classify and predict the network data, it is also necessary to pre-process the network traffic data to be identified to obtain the corresponding one-dimensional, two-dimensional and three-dimensional vector features, which are then input them into the known network traffic classification model for classification and prediction.

In step S120, the processed network traffic features are input into an integrated known network traffic classification model. In this embodiment, in constructing the known network traffic classification model, a known network traffic classification model based on a deep neural network is proposed, and a convolutional neural network (CNN) is selected as the deep neural network model. As a basic model, the CNN supports learning of data features in different dimensions in a process of training the known network traffic classification model.

As shown in FIG. 4, the integrated classification model for known network traffic $M_{ensemble}$ is mainly composed of three parts which respectively use different training feature sets, namely, a traffic classification subnetwork model $M_n$ using only known normal traffic F_$H_n$={1d_$H_n$, 2d_$H_n$, 3d_$H_n$} as training features, a traffic classification subnetwork model $M_p$ using only known malicious traffic F_$H_p$={1d_$H_p$, 2d_$H_p$, 3d_$H_p$} as training features and a traffic classification subnetwork model $M_m$ using both the known normal traffic and the known malicious traffic as training features.

The traffic classification subnetworks each include three multi-dimensional deep neural network fusion models, and uses different feature sets to train the three multi-dimensional deep neural network (CNN) fusion models including the one-dimensional deep neural network, the two-dimensional deep neural network, the three-dimensional deep neural network and the decision information fusion layer. One-dimensional vector data, two-dimensional vector data and three-dimensional vector data corresponding to the training data are input into the corresponding one-dimensional depth neural network, two-dimensional depth neural network and three-dimensional depth neural network for training, and then decision information of different-dimensional networks is input into the decision information fusion layer for fusion, and then a class prediction result of the known traffic training data are output.

An input vector of the one-dimensional CNN classification model is 1×1456 in size. An input vector size of the two-dimensional CNN classification model is 39×39 in size, which can be visualized as a two-dimensional grayscale image. In the three-dimensional CNN classification model, the input vector is converted into a 22×22×3 three-dimensional tensor, which can be visualized as a 24-bit RGB image. For each of the classification models, feature extraction is performed on the input vector by two successive convolution layers, which is activated by a ReLU function after each convolution to improve a convergence speed of the model. After feature extraction, the features are combined by a dense layer, and finally output probabilities are normalized using the Softmax layer, which are finally mapped to probabilities that the traffic data belongs to a certain class.

In this embodiment, detailed parameters of the known network traffic classification model are provided as shown in Table 1:

TABLE 1

Detailed parameters of the known network traffic classification model

| Classification Model | One-dimensional CNN | Two-dimensional CNN | Three-dimensional CNN |
|---|---|---|---|
| Vector Size | 1 × 1521 | 39 × 39 | 22 × 22 × 3 |
| Vector Length | 1521 | 1521 | 1452 |
| Convolution Kernel Size | (1 × 9) × 16 (1 × 9) × 16 | (3 × 3) × 64 (3 × 3) × 32 | (3 × 3 × 3) × 64 (3 × 3 × 3) × 32 |
| Activation Function | ReLU | ReLU | ReLU |
| Parameters of Fully connected layer | 1289 | 1289 | 1289 |
| Softmax Layer | YES | YES | YES |

In a process of training the known traffic classification model, four traffic feature ordering strategies are respectively used to generate four different sets of known normal and known malicious traffic features, and four different integrated classification models for the known network traffic are respectively trained by using four sets of features, and effects under different feature pre-processing strategies are evaluated by cross-validation. Then, integrated classification models for the known network traffic with highest accuracy is selected as a final integrated classification model, and a same feature pre-processing strategy as the model with the highest accuracy is adopted for subsequent traffic to be identified.

In step S130, the integrated classification model $M_{ensemble}$ for the known network traffic includes a known normal traffic classification model $M_n$, a known malicious traffic classification model $M_p$ and a known traffic classification model $M_m$. Each of the models contains CNN models in three dimensions, and sample probabilities of respective Softmax layers of the three CNN models are fused by the decision information fusion layer. For a sample x, an output result of the decision information fusion layer that defines the classification model M is $S^N(x)=\{s_1, \ldots, s_N\}$, which corresponds to probabilities of data of the sample x belonging to different classes n, where n is a number of known traffic classes used in training the current model, and $s^*=\max(s_n)$ is taken as prediction confidence of the sample x from the model.

In actual use, the network traffic P to be identified may contain known or unknown normal and malicious traffic, and P is defined as a mixed network traffic packet of the unknown network traffic $P_u$ and the known network traffic $P_c$. Firstly, an optimal feature pre-processing strategy selected in a process of training the integrated classification model for the known traffic is used to pre-process the traffic data to obtain its one-dimensional, two-dimensional and three-dimensional features, and then the known normal traffic classification model $M_n$, the known malicious traffic classification model $M_p$ and the known traffic classification model $M_m$ are used to perform prediction on the samples respectively. Based on characteristics of the deep neural network classification model with high prediction confidence for trained samples and low prediction confidence for unknown samples, the known network traffic classification model is used to perform prediction on each of the samples to be identified. In this disclosure, an adaptive confidence threshold θ is set, and unknown network traffic data with low confidence of the sample prediction class results will be screened out from mixed network packets. That is, in step S130, preliminary determination for the unknown traffic data is made for corresponding traffic data according to the class prediction result.

Specifically, the class prediction result of the sample is determined based on the confidence threshold: if the class prediction result is less than the confidence threshold, the traffic data corresponding to the class prediction result is determined as unknown traffic data; and if the class prediction result is greater than the confidence threshold, it is determined that the traffic data corresponding to the class prediction result is known traffic data.

In this embodiment, pseudo code of the unknown traffic determination method based on the adaptive confidence threshold is also provided as follows.

Input: the network traffic to be identified P, the confidence threshold θ, the threshold adjustment parameter α, a number of unknown traffic samples num_unknow, and feature ordering pre-processing strategy adopted strategy Output: the identified unknown traffic data feature set $P_u$ 1. The pre-processing strategy strategy is used to pre-process the features of P
2. Create unknown traffic storage lists [$B_n$, $B_p$, $B_m$] for the three models
3. for M in [$M_n$, $M_p$, $M_m$]: #make predictions respectively
4. for x in P: #for all traffic to be identified
5. $S^N(x)=M(x)$
6. $s^*=\max(s_n)$
7. if $s^* \geq \theta$: #the prediction confidence of the model is high
8. x does not belong to the unknown traffic
9. If $s^* < \theta$: #the prediction confidence of the model is low
10. x is stored in an unknown traffic list B corresponding to the model
11. if len(B)≥num_unknow:
12. take num_unknow samples with lowest confidence in B
13. if len(B)<num_unknow and len(B)>0:
14. θ=θ*(1+a)
15. return to step 4
16. if len(B)==0:
17. B←∅
18. $P_u=B_n \cap B_p \cap B_m$ #take intersection of identification results of the three models
19. return $P_u$ A preset number of traffic data with a lowest class prediction result is determined as the unknown traffic data when traffic data in the network traffic data set a number of which exceeds the preset number num_unknow (usually 1500) is preliminarily determined as unknown traffic data.

Furthermore, for each preliminary determination for the unknown traffic data is made on the whole network traffic data set according to the class prediction result and the confidence threshold, an initial value of the adaptive confidence threshold is a preset value, and when traffic data in the network traffic data a number of which is less than the preset number is preliminarily determined as unknown traffic data, the preset value is increased by a factor of (1+a), where a is a preset parameter, and when the unknown traffic cannot be identified with an initial threshold, it is determined that the model has not identified the unknown traffic.

Furthermore, the confidence threshold θ is used in the adaptive adjustment strategy, and a main purpose of this strategy is to screen out the unknown traffic data from the mixed network traffic packets as accurately as possible. Therefore, θ is initially given a default initial value, which is generally set to be 0.9, with an upper limit being set to be 0.98. If the screened unknown network traffic data is less than num_unknow, a value of θ will be increased by the factor of (1+a), where a is a preset parameter. If the screened unknown network traffic data exceeds num_unknow, the top num_unknow traffic samples with lowest prediction confidence of the model will be selected according to uncertainty.

The unknown traffic data in the traffic to be identified are respectively identified with the known normal traffic classification model $M_n$, the known malicious traffic classification model $M_p$ and the known traffic classification model $M_m$ to obtain three unknown traffic packets $B_n$, $B_p$, $B_m$, and intersection among them is taken as the final identified unknown network traffic.

In order to further analyze the identified unknown network traffic data and find out an unknown traffic class the unknown network traffic data may belong to, that is, in step S140, for the adaptive labeling method for the unknown network traffic, a principal component analysis method is first used to perform dimension reduction on the traffic data features, and then the features subjected to the dimension reduction are used for clustering analysis, so as to improve efficiency of the clustering method and interference of irrelevant features on clustering results.

In this embodiment, the adaptive labeling method for the unknown network traffic mainly includes two steps: dimension reduction of features and adaptive clustering. Because it is difficult for high-dimensional traffic data to be used directly, it is necessary to reduce its dimension to improve operation efficiency and clustering accuracy. However, in traditional methods, some features are generally selected from high-dimensional features, which lose feature information in different dimensions. Therefore, the PCiA (Principal Component Analysis) is used for clustering in this method, which is a commonly used data analysis method, and transforms original data into a set of linearly independent representations in respective dimensions through linear transformation, which can be used to extract the principal feature components of data and is often used for dimension reduction of the high-dimensional data. An idea of the PCA is to map a W-dimensional feature of original data to a k-dimensional space where k<W, a k-dimensional is a new orthogonal feature and represents orthogonal projection of the original feature data on a low-dimensional linear space, which is called a principal subspace, that is, a maximum variance theory.

The adaptive labeling method is realized by clustering the unknown traffic data. Because a specific number of classes of the identified unknown network traffic is not known, the clustering method adopted is a bottom-up agglomerative hierarchical clustering algorithm. The agglomerative hierarchical clustering algorithm considers each data as a separate class at first, then selects nearest two or more classes to merge according to a certain distance measure, and then repeats a merging process until a number of existing classes gradually decreases. Compared with partition-based methods such as K-means algorithm, which always need to randomly select a starting position of partition, it is easy to fall into local optimum. It is easier for the hierarchical clustering method to find out different classes in network traffic data, but with higher computational complexity of the hierarchical clustering algorithm than the partition-based methods. SLINK algorithm of the agglomerative hierarchical clustering is selected for the clustering model, which aggregates different data clusters from bottom to top. The aggregation is based on a distance between different data clusters, and the data clusters are sets of data points. Therefore, in the SLINK algorithm, a distance between points among two data clusters with a smallest distance therebetween is taken as an inter-cluster distance. In the hierarchical clustering algorithm, all of the data is converged into a data cluster through an iterative clustering process, but a number of classes contained in the unknown traffic can be verified by setting an expected number of data clusters n_clusters. After the unknown traffic is clustered to get n_clusters possible classes, in this method, a Calinski-Harabasz (C-H) index is used to evaluate the clustering results. The C-H index indicates a ratio between intra-class variance and inter-class variance. The higher the index, the larger the inter-class variance; and the smaller the intra-class variance, and the better a clustering effect. A number of classes with the highest C-H index is selected as a number of classes of the final unknown traffic data, and then a corresponding model is used to get a class label of the unknown traffic data.

In this embodiment, algorithm pseudo code for data dimension reduction and clustering process is also provided as follows.

Input: unknown traffic data feature set $P_u$, a number of features for principal component analysis k, a maximum number of data clusters searched n clusters, Output: identify the marked unknown traffic data ($P_u$, Y)

1. characteristic values of samples in $P_u$ are centralized:

$$x_i \leftarrow x_i - \frac{1}{n}\sum_{i=1}^{n}x_i$$

2. obtain a covariance matrix of the sample set:

$$CovM = \frac{1}{n}P_u^T P_u$$

3. solve eigenvalues and eigenvectors of the covariance matrix 4. select eigenvectors $\{w_1, \ldots, w_d\}$ corresponding to top k eigenvalues.

5. compose an eigenvector matrix $U=[w_1, \ldots, w_d]$ with the eigenvectors 6. solve a feature matrix $P_u'=P_u \times U$ of the unknown traffic data subjected to dimension reduction 7. result, score_list←∅

8. for n in 2 to n_clusters: #for clustering analysis

9. $M_{clustering}$=AgglomerativeClustering(n)

10. result←$M_{clustering}$.pred($P_u'$) #get the clustering results 11. score_list←C-H (result, $P_u'$) #calculate the C-H index 12. Y=result [argmax(score_list)] #take a number of the cluster classes with highest scores and corresponding labels as the final unknown traffic label.

13. return ($P_u$, Y)

With the adaptive class clustering method, the labeled unknown traffic data composed of the number of the final unknown traffic classes and corresponding labels are obtained. After getting the data features and class labels of the unknown traffic, malice traffic data in the unknown traffic data is determined in the following.

In step S150, the malicious traffic in the identified unknown traffic data ($P_u$, Y) is further analyzed by a method based on data similarity. In this disclosure, similarity of traffic data is estimated by calculating the K-L divergence indexes of the identified malicious traffic data features and the normal traffic data features. Malicious traffic in the network is often generated by some commonly used attack tools or malicious codes. The new types of added unknown attacks have similarities with past attacks, and similarity between malicious attack traffic and normal network traffic will be small. Therefore, by analyzing similarities between new traffic in the unknown traffic and the historical normal traffic and malicious traffic, it can be analyzed whether the unknown traffic is the malicious traffic.

Firstly, for the unknown traffic data $(P_u, Y)$ and class labels marked by clustering, for each class $y_i$ and its corresponding data features $X_i$, similarity between the unknown traffic data and all of known normal traffic data $H_n = \{h_n^1, \ldots h_n^K\}$ and known malicious traffic data $H_p = \{h_p^1, \ldots, h_p^L\}$ is solved by a relative entropy method, which is then ordered according to the data similarity, and three traffic classes that are most similar to the class $y_i$ are obtained. If all of the three traffic are normal, that is, it is determined that $y_i$ is the normal traffic and marked, otherwise, it is determined that $y_i$ is the malicious traffic and marked. With this processing method, the malicious traffic can be identified and found more effectively, thus ensuring accurate and effective identification of the unknown malicious traffic by the model.

In this embodiment, pseudo code for similarity evaluation is also provided as follows.

Input: identify the marked unknown traffic data $(P_u, Y) = \{X_i, y_i\}$ and the historical known traffic data $H_n, H_p$ Output: the unknown traffic data set $(P_u, Y_{NEW})$ after the malicious traffic is marked.

1. for $(X_i, y_i)$ in $(P_u, Y)$: #for clustering analysis
2. Similarity_score←∅
3. for h in $H_n \cup H_p$:
4. v=min[count($X_i$), count(h)]
5. take v samples $X_v$ and $h_v$ from $X_i$ and h
6. calculate KL divergence $$KL(X_v \| h_v) = \sum_d h_v(x) \log \frac{h_v}{X_v}$$

or the samples
7. Similarity_score←KL($X_v \| h_v$)
8. get the top three labels $h_1, h_2, h_3$ with highest scores
9. if $\forall h \in \{h_1, h_2, h_3\}$: h∈$H_n$:
10. $y_i$←negative #$y_i$ is normal traffic
11. else:
12. $y_i$←positive #$y_i$ is malicious traffic
13. return $(P_u, Y_{NEW})$ In step S160, after labeling the unknown network traffic, the traffic data can be added to an earliest known network traffic data set for training and updating the known network traffic classification model. With this process, the model can continuously identify and label new unknown traffic in the network, and always identify the unknown traffic efficiently and accurately in a dynamic evolving actual network environment.

Figure 5:
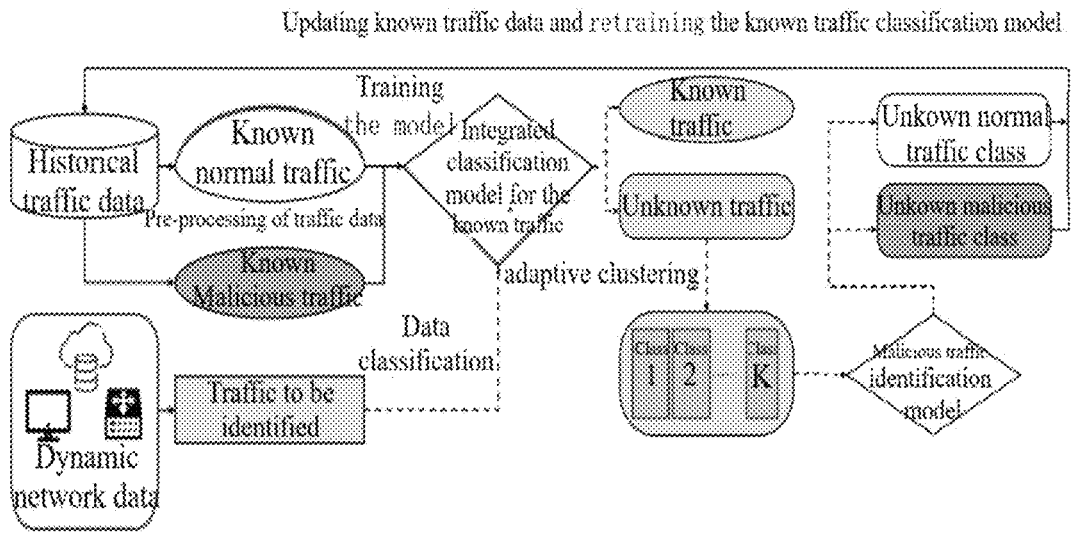
FIG. 5 is a flowchart of a method for identifying unknown traffic data based on an overall model structure according to an embodiment.

In an embodiment, the known network traffic classification model, the confidence threshold determination and the adaptive labeling method for the unknown traffic data can be taken as a complete unknown data identification model, and a process of unknown traffic data identification method based on the completed model is shown in FIG. 5.

In the method for identifying unknown traffic data based on the dynamic network environment, the known traffic in the network data is classified by using the known network traffic classification model, then the preliminary determination is performed according to a classification prediction result, network data preliminarily determined as the unknown traffic data is classified by using the adaptive clustering method, and then respective classes are identified by using the similarity coefficient estimation method so as to identify the classes of the malicious traffic and the normal traffic, that is, to further identify and learn the unknown traffic data, and transform it into known traffic data, and then the known network traffic classification model is trained and updated again with the new known traffic data, so that the known network traffic classification model should learn and be trained with the emerging new network data in practical application, so that it has ability to identify more network traffic data and continuously improves ability to identify unknown traffic data, which is suitable for the dynamic network environment with rapid changes nowadays.

In constructing the known network traffic classification model and the unknown traffic identification model, in order to make full use of validity of traffic data features, the one-dimensional, two-dimensional and three-dimensional CNN models are constructed by extracting feature information from multiple dimensions.

In identifying the unknown traffic, unknown traffic data with low prediction confidence is screened out with the adaptive confidence threshold according to the prediction confidence of the known network traffic classification model.

It should be understood that although steps in the above flowchart in FIG. 1 are shown in sequence as indicated by arrows, these steps are not necessarily executed in sequence as indicated by arrows. Unless explicitly stated in this disclosure, there is no strict sequence restriction on execution of these steps, and these steps can be executed in other sequences. Moreover, at least a part of the steps in FIG. 1 may include a plurality of sub-steps or stages, which are not necessarily completed at the same time, but can be executed at different times, and these sub-steps or stages is not necessarily executed in a sequential order, but can be alternately or alternatively executed with other steps or sub-steps of the other steps or at least a part of the stages.

Figure 6:
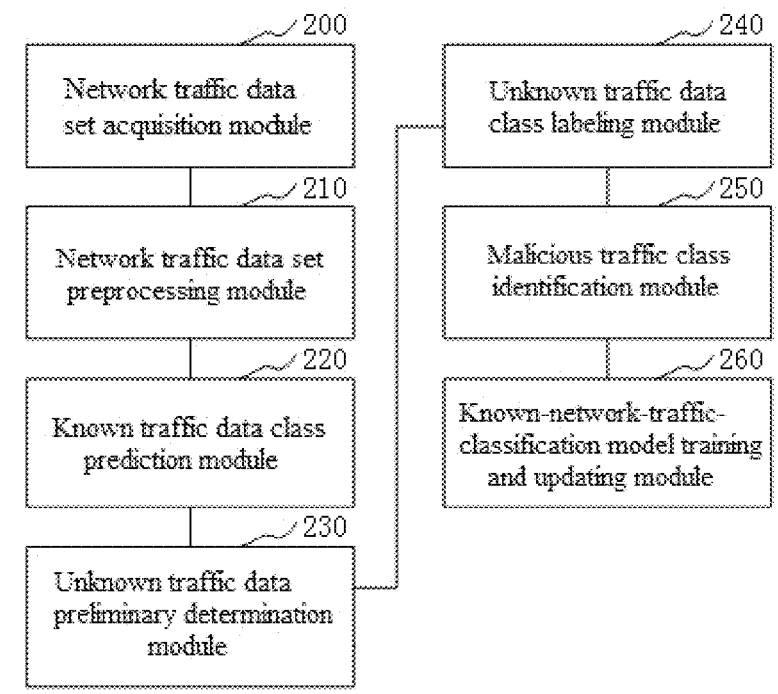
FIG. 6 is a structural block diagram of a device for identifying unknown traffic data according to an embodiment.

In an embodiment, as shown in FIG. 6, a device for identifying unknown traffic data based on a dynamic network environment is provided, which includes a network traffic data set acquisition module 200, a network traffic data set preprocessing module 210, a known traffic data class prediction module 220, an unknown traffic data preliminary determination module 230, an unknown traffic data class labeling module 240, a malicious traffic class identification module 250 and a known-network-traffic-classification model training and updating module 260.

The network traffic data set acquisition module 200 is configured for acquiring a network traffic data set to be identified, the network traffic data set includes a plurality of known traffic data and/or unknown traffic data, both the known traffic data and the unknown traffic data contain normal traffic data and malicious traffic data.

The network traffic data set pre-processing module 210 is configured for pre-processing the network traffic data set based on traffic feature ordering to obtain traffic data features in multiple dimensions.

The known traffic data class prediction module 220 is configured for inputting the traffic data features in the multiple dimensions into a known network traffic classification model to predict a class of respective traffic data in the network traffic data set, and outputting respective class prediction result.

The unknown traffic data preliminary determination module 230 is configured for performing preliminary determination for unknown traffic data on traffic data corresponding to the class prediction result according to a self-adaptive confidence principle to obtain the unknown traffic data.

The unknown traffic data class labeling module 240 is configured for classifying the unknown traffic data into different classes according to an adaptive clustering method, and initially labeling the unknown traffic data according to the divided classes.

The malicious traffic class identification module 250 is configured for identifying a class of the unknown traffic data according to a similarity coefficient estimation method to obtain classes for malicious traffic and normal traffic in the unknown traffic data.

The known-network-traffic-classification model training and updating module 260 is configured for training and updating the known network traffic classification model with malicious traffic data and normal traffic data identified in the unknown traffic data as known traffic data.

For specific definition of the device for identifying unknown traffic data based on the dynamic network environment, definition of the method for identifying unknown traffic data based on the dynamic network environment above can be referred, which will not be repeatedly described herein. Respective modules in the device for identifying the unknown traffic data based on the dynamic network environment can be implemented in whole or in part by software, hardware and combination thereof. Respective modules described above can be embedded in or independent of a processor in a computer device in a form of hardware, or stored in a memory in the computer device in a form of software, so that the processor can call and execute operations corresponding to the above modules.

Figure 7:
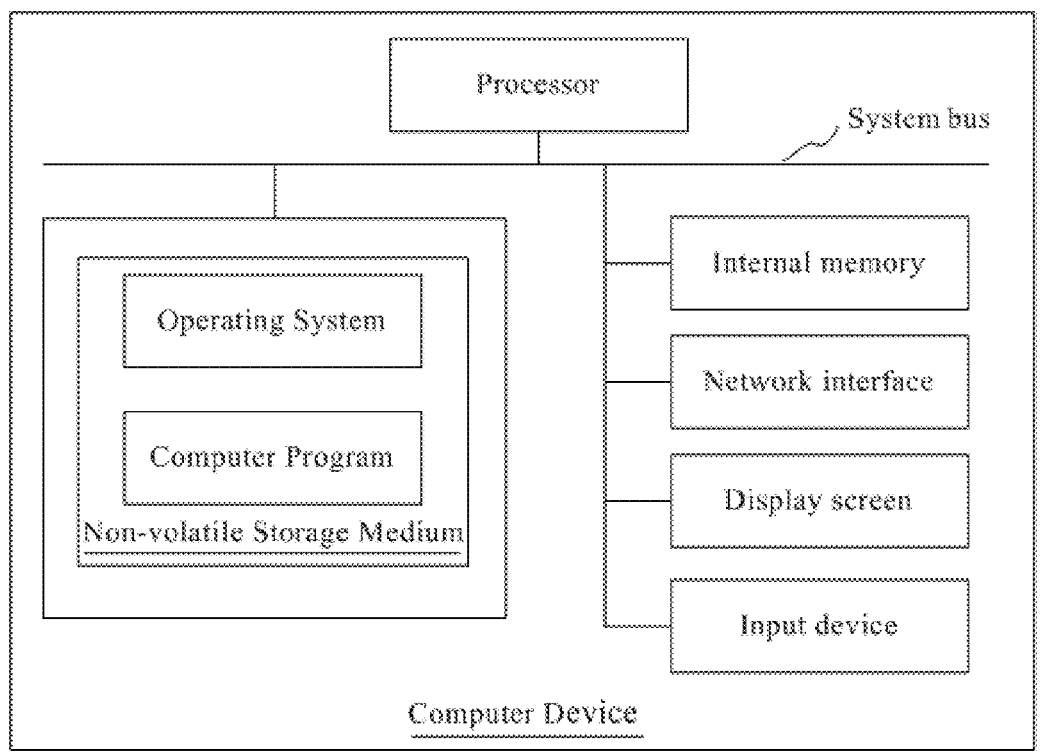
FIG. 7 is an internal structural diagram of a computer device in an embodiment.

In an embodiment, a computer device is provided, which can be a terminal, with its internal structure diagram being shown in FIG. 7. The computer device includes a processor, a memory, a network interface, a display screen and an input device connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for operations of the operating system and computer programs in the nonvolatile storage medium. The network interface of the computer device is configured to communicate with external terminals through network connection. The computer program is executed by the processor to realize the method for identifying unknown traffic data based on the dynamic network environment. A display screen of the computer device can be a liquid crystal display screen or an electronic ink display screen, and the input device of the computer device can be a touch layer covered on the display screen, or a button, a trackball or a touch pad arranged on a shell of the computer device, or can be an external keyboard, touch pad or mouse.

It can be understood by those skilled in the art that the structure shown in FIG. 7 is only a block diagram of part of the structure related to schemes of this disclosure, and does not constitute a limitation on the computer device to which schemes of this disclosure are applied. The specific computer device may include more or less components than those shown in the figure, or combine some components or have a different component arrangement.

In an embodiment, a computer device is provided, which includes a memory and a processor. The memory stores a computer program, and the processor executes the computer program to realize following steps:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions; inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data;

classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data; and training and updating the known network traffic classification model with malicious traffic data and normal traffic data identified in the unknown traffic data as known traffic data.

In an embodiment, a computer-readable storage medium having a computer program stored thereon is provided in an embodiment of the present disclosure. Following steps are implemented when the program is executed by a processor:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions; inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data;

classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data; and training and updating the known network traffic classification model with malicious traffic data and normal traffic data identified in the unknown traffic data as known traffic data.

The use data in the experiment is mainly derived from the public data set and simulated traffic data, which includes both normal network service traffic data, such as browsers, emails, chat software, file transfers, etc., as well as malicious network traffic such as network intrusion and network attack, wherein, the data attribute table and raw data obtained through data preprocessing are shown in Table 1:

TABLE 1

Experimental data

| serial number | The data name | The size of the data file | The number of data traffic bars | Traffic category |
|---|---|---|---|---|
| 1 | browsers | 17740 KB | 20692 | normal |
| 2 | email | 3183 KB | 32566 | normal |
| 3 | facebook_audio | 16084 KB | 91815 | normal |
| 4 | ftps_up | 88633 KB | 93191 | normal |
| 5 | scpDown | 373426 KB | 85018 | normal |
| 6 | sftp_up | 93570 KB | 107234 | normal |
| 7 | youtube | 22013 KB | 12738 | normal |
| 8 | DDOS | 3752 KB | 16797 | malicious |
| 9 | IDS | 6594 KB | 6632 | malicious |
| 10 | HancitorCobaltStrike | 6279 KB | 10790 | malicious |
| 11 | HancitorFickerStealer | 10386 KB | 15108 | malicious |
| 12 | Qakbot-spx119 | 23874 KB | 38335 | malicious |

Figure 3A:
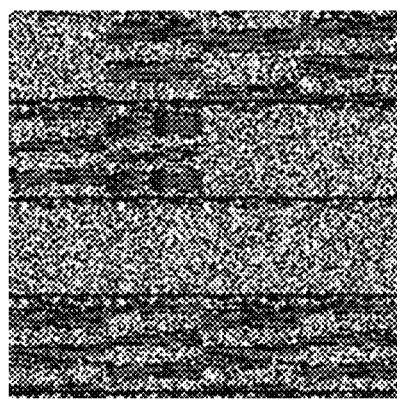
FIGS. 3A-3B are schematic diagram, where
Figure 3B:
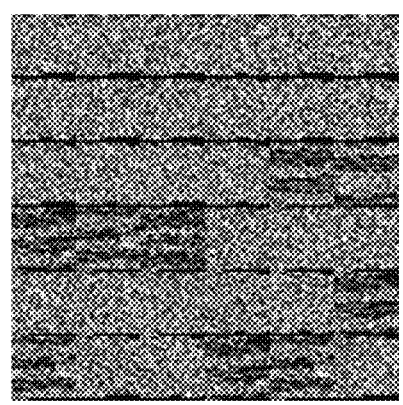

After processing the pcap file into the expected 1D, 2D, and 3D vectors, the 2D and 3D data vectors are visualized, and the values of the vectors are treated as grayscale or RGB values. For example, without limitation, the two-dimensional data vectors (39×39) are visualized as a grayscale plot and the three-dimensional data vectors (22×22×3) are visualized as a 24-bit RGB plot, as shown in FIG. 3A and FIG. 3B.

The preprocessed pcap data becomes one-dimensional, two-dimensional, and three-dimensional vectors of the same length, and the three types of vectors are used as inputs to the convolutional neural network in the next step to train and predict the model.

The input vector size of the one-dimensional CNN classification model is 1×1456. The input vector size of the 2D CNN classification model is 39×39 and can be visualized as a grayscale 2D image. In the 3D CNN classification model, the input vector is converted to a 3D tensor of 22×22×3, which may be visualized as a 24-bit RGB image. In the designed classification model, the input vectors are feature extracted through two consecutive convolutional layers, and after each convolution, they are activated by the ReLU function to improve the convergence speed of the model. After feature extraction, the feature combination is performed by the dense layer, and finally the output probability is normalized by using the Softmax layer and mapped to the category of traffic. The detailed parameters for the three classification models are shown in Table 2, where cluster_num represent the number of traffic categories. Table 2 Model detailed parameters

TABLE 2

Model detailed parameters

| Classification model | One-dimensional CNN | Two-dimensional CNN | 3D CNN |
|---|---|---|---|
| Enter a size | 1 × 1456 | 39 × 39 | 22 × 22 × 3 |
| Enter the length | 1456 | 1521 | 1452 |
| Convolutional kernel size | (1 × 9) × 16 (1 × 9) × 16 | (3 × 3) × 64 (3 × 3) × 32 | (3 × 3 × 3) × 64 (3 × 3 × 3) × 32 |
| Activate the function | relu | relu | relu |
| Dense layer | 1289 | 1289 | 1289 |
| Softmax layer | cluster_num be | cluster_num be | cluster_num be |

From the network traffic data provided in Table 1, the three normal network traffic data of facebook_audio, ftps_up, and scpDown, and IDS, Hancitor CobaltStrike, were selected as known network traffic data for analysis.

In the experiment, 5000 packets were selected from the traffic of 5 different applications selected as known, and combined together to obtain the initial data set of known traffic. Both use the Select Random Sampling (Strategy_random) method for sample selection. With the learning rate set to 0.001, using the Adam optimizer, using cross entropy loss as the loss function, and using the initial data set to train the neural network classification model, the loss and correctness of the training process may be statistically observed. As the training progresses, the classification model converges, and the loss value and accuracy rate may stabilize. When the model stabilizes, iteration is stopped. Table 3 shows the classification results of the fused CNN model and the classification results of the three different dimensions of the CNN model.

TABLE 3

Classification model training results

| Classification model | Loss value | Accuracy rate |
|---|---|---|
| One-dimensional CNN | 0.9051 | 99.9130% |
| Two-dimensional CNN | 0.9071 | 99.8161% |
| 3D CNN | 0.9089 | 99.6920% |
| Fusion CNN | 0.9051 | 99.9760% |

Subsequently, the remaining packets in the 5 known application traffic packages are used to form the test set, the data loader is used to encapsulate the test set data, and the number of batches is set to 1000 to form the test set. Test sets may be used to test model effects and statistically classify effects.

TABLE 4

Model Classification Results Statistics

| Classification model | Accuracy rate (%) | Average loss |
|---|---|---|
| One-dimensional CNN | 98.78 | 0.0009 |
| Two-dimensional CNN | 98.46 | 0.0009 |
| 3D CNN | 95.27 | 0.0010 |
| Fusion CNN | 97.41 | 0.0010 |

After the training of the model, the fusion CNN model on the overall dataset can still achieve 97.41% accuracy, indicating that the convolutional neural network can effectively extract the characteristics of various application traffic, and does not require a substantially large training set scale to achieve excellent performance.

In the real traffic environment, the known traffic is typically limited, and there are many unknown parts that are difficult to grasp and control. In the experiment, the real traffic environment is simulated by mixing known traffic and unknown malicious traffic. 1000 traffic packets are selected in each of the five known applications (e.g., facebook_audio, ftps_up, scpDown, IDS and Hancitor CobaltStrike), DDOS and youtube traffic packets are selected as unknown network traffic, and unknown traffic identification experiments are conducted. Among them, the unknown network traffic contains a total of 29535 traffic data, and the known network traffic data is 5000, for a total of 34535 network traffic data.

By setting the threshold parameter to 0.98, the unknown network traffic data is identified, and the known and unknown network traffic data results after the identification are obtained as shown in Table 5 below:

TABLE 5

Unknown traffic identification results

| | | forecast | |
|---|---|---|---|
| | | Unknown | known |
| authentic | Unknown | 29107 | 413 |
| | known | 225 | 4755 |

By filtering the 1,500 pieces of network traffic data with the lowest confidence, where the packets predicted as unknown network traffic contain a specific number of traffic data for each category as shown in Table 6:

TABLE 6

Unknown traffic data information table

| category | quantity |
|---|---|
| facebook_audio | 30 |
| ftps_up | 6 |
| scpDown | 17 |
| IDS | 3 |
| HancitorCobaltStrike | 4 |
| DDOS | 947 |
| youtube | 493 |

From the data in the table, it can be seen that through unknown traffic identification and further screening, it is possible to filter out unknown traffic from the data that mixes known and unknown network traffic, and the proportion of unknown traffic in 1500 network traffic data accounts for about 96%.

Using the PCA method to reduce the dimensionality of unknown traffic data and assuming normal circumstances, the number of new traffic categories does not exceed 10, the categories from 2 to 10 are clustered with a K-means++ algorithm as the number of clusters, and the Carinski-Harabasz index is calculated separately, and the results are shown in Table 7:

TABLE 1

Clustering CH values

| The number of categories | Ch value |
|---|---|
| 2 | 164529.069 |
| 3 | 123702.255 |
| 4 | 128634.691 |
| 5 | 130873.957 |
| 6 | 129106.973 |
| 7 | 133967.788 |
| 8 | 149395.968 |
| 9 | 156254.426 |

According to the principle of maximum CH value, the model with a cluster number of 2 and the corresponding label are selected. Most of the data is correctly distinguished by clustering models, and clustering statistics are shown in Table 8. Table 8 Clustering results statistics It can be obtained from the results from the table that the data with clustering result of unknown class 0 contains a total of 964 traffic data, including 903 DDOS traffic data, and its clustering accuracy is 95.5%. The 536 traffic data of the unknown class 1 contains a total of 472 traffic data of the Youtube category, and the cluster accuracy is 88.1%.

TABLE 8

Clustering results statistics

| | | Unknown class 0 | Unknown class 1 |
|---|---|---|---|
| Original label | facebook_audio | 26 | 4 |
| | ftps_up | 4 | 2 |
| | scpDown | 7 | 10 |
| | IDS | 0 | 3 |
| | HancitorCobaltStrike | 3 | 1 |
| | DDOS | 903 | 44 |
| | youtube | 21 | 472 |

In order to verify the malicious traffic identification effect based on similarity assessment, first, the known network traffic data is constructed into a reference dataset for the similarity evaluation, and there are 10 types of traffic data selected, of which 6 types are normal traffic, and 4 types are malicious traffic (to easily display the experimental results, * is used to mark malicious traffic), and the selected traffic data is shown in Table 9. Among them, 2500 are randomly selected from the raw data of each traffic.

TABLE 9

Reference dataset information for similarity assessments

| serial number | The data name | The number of data traffic bars | Traffic category |
|---|---|---|---|
| 1 | browsers | 20692 | normal |
| 2 | email | 32566 | normal |
| 3 | facebook_audio | 91815 | normal |
| 4 | ftps_up | 93191 | normal |
| 5 | scpDown | 85018 | normal |
| 6 | sftp_up | 107234 | normal |
| *7 | IDS | 6632 | malicious |
| *8 | HancitorCobaltStrike | 10790 | malicious |
| *9 | HancitorFickerStealer | 15108 | malicious |
| *10 | Qakbot-spx119 | 38335 | malicious |

The dataset calculation and discriminant results are shown in Table 10, which calculates the KL divergence values of traffic data for each category in the unknown class and the reference dataset, respectively. Among them, the data of the unknown class are the network traffic data of the two unknown classes obtained by clustering in step 3 of the experiment.

TABLE 10

Cluster unknown traffic discriminant table

| Data name | Traffic category | 1 | 2 | 3 | 4 | 5 | 6 | *7 | *8 | *9 | *10 |
|---|---|---|---|---|---|---|---|---|---|---|---|
| Unknown class 0 | DDOS | malicious | 22.50 | 10.50 | 12.40 | 11.40 | 12.56 | 11.18 | 11.20 | 9.60 | 12.97 | 10.30 |
| Unknown class 1 | youtube | normal | 18.90 | 11.00 | 14.20 | 9.61 | 9.95 | 9.51 | 14.22 | 14.29 | 13.86 | 14.09 |

As can be seen from the results in Table 10, the unknown classes 1 and Hancitor CobaltStrike, Qakbot-spx119, and email Traffic data have the highest degree of similarity, can be identified as malicious traffic, and its actual category is DDOS malicious traffic data. The similarity assessment results of youtube traffic data show that the three most similar types of network traffic data are ftps_up, scpDown and sftp_up, and the judgment results are normal traffic data, and the actual category is youtube Normal traffic data. Correct judgment is achieved for all normal and malicious traffic, which proves that the method can further effectively identify malicious network traffic.

The two types of unknown network traffic identified in the above experiment are used to retrain the network traffic classification model, including unknown class 0 (DDOS) containing 964 traffic data, and unknown class 1 (youtube 536 network traffic data). In addition, 1000 traffic messages are selected from each of the traffic packets of five known applications of facebook_audio, ftps_up, scpDown, IDS and Hancitor CobaltStrike to train a network traffic classification model. The model employs the same structure and training method as in the first step of the experiment, after which the remainder and entire facebook_audio, ftps_up, scpDown, IDS, and Hancitor CobaltStrike traffic packets will be used. DDOS and Youtube data are used as test data to classify seven types of network traffic data, and the recognition accuracy of the updated recognition model is obtained. As shown in Table 11:

TABLE 11

Results of the updated network traffic classification model

| Classification model | Accuracy rate (%) | Average loss |
| --- | --- | --- |
| One-dimensional CNN | 97.47 | 0.0009 |
| Two-dimensional CNN | 96.95 | 0.0009 |
| 3D CNN | 95.37 | 0.0010 |
| Fusion CNN | 96.51 | 0.0010 |

Among them, the fused CNN model achieved an accuracy of 96.51%. Ability to accurately classify 7 types of network traffic data. The experimental results illustrate and prove the effectiveness of this method.

The first step of the experiment trains a known network traffic classification model, which proves that the method can accurately classify the known network traffic data. In the second step of the experiment, the unknown traffic is identified by the discriminant method based on the confidence degree, and the experimental result method can effectively identify the unknown traffic. The third step of the experiment analyzes the unknown traffic identified in the second step by clustering. Experimental results illustrate that the method can effectively analyze the categories of traffic data that may be contained in unknown traffic data. Clustering results are highly accurate. The experimental results of the fourth step of the experiment show that the similarity-based method can accurately identify malicious traffic in unknown traffic. The fifth step of the experiment uses the identified unknown traffic as a training set to retrain a new network traffic classification model. Experimental results show that the new network traffic classification model has high accuracy.

In general, the method of the present disclosure identifies unknown network traffic, determines the categories contained therein, and identifies malicious traffic categories. The identified categories are used to further train the network traffic classification model, which can achieve high accuracy results. The method is shown to have accurate traffic classification capabilities in a dynamic network environment where new categories are constantly emerging.

At present, there is little research on traffic identification methods in dynamic network environments. The following is a comparison of several representative methods and this method. Bekerman et al. [1] propose an end-to-end-based supervised system for detecting malware by analyzing network traffic. But their approach can only work in a simulated environment that contains only malicious traffic, and cannot handle a real environment that contains both normal and malicious traffic. Zhang [2] et al. proposed a method based on deep neural networks and constrained clustering to identify unknown network traffic. But their approach cannot analyze whether unknown traffic is malicious and does not have the ability to adaptively update to be applied in dynamic network environments. The method proposed by Song[3] et al. uses an improved naïve Bayesian nuclear classifier to identify network traffic, but cannot effectively identify unknown traffic. Zhang [4] et al. propose an unknown traffic recognition method based on deep neural networks, which cannot cope with dynamic network environments where new categories are constantly emerging. And their methods cannot identify whether the identified network traffic is malicious or not. At the same time, their method requires repeated training of the model many times, resulting in a high computational complexity.

[1] D. Bekerman, B. Shapira, L. Rokach and A. Bar, "Unknown malware detection using network traffic classification," 2015 *IEEE Conference on Communications and Network Security (CNS)*, 2015, pp. 134442, doi: 10.1109/CNS.2015.7346821.

[2] Zhang Y, Zhao S, Sang Y. Towards unknown traffic identification using deep auto-encoder and constrained clustering[C]/International Conference on Computational Science. Springer, Cham, 2019: 309-322.

[3] R. Song and T. Wi "Machine Learning-Based Traffic Classification of Wireless Traffic," 2019 international Conference on Military Communications and Information Systems (ICMCIS), 2019, pp. 1-8, 10.1109/ICMCIS.2019.8842671.

[4] J. Zhang, F. Li, F. Ye and H. Wu, "Autonomous Unknown-Application Filtering and Labeling for DL-based Traffic Classifier Update," IEEE INFOCOM 2020—IEEE Conference on Computer Communications, 2020, pp. 397-405, doi 10.1109/INFOCOM41043.2020.9155292.

It can be understood by those skilled in the art that all or part of the processes in the above-mentioned methods can be completed by instructing related hardware through computer programs, which can be stored in a non-volatile computer readable storage medium, and when executed, can include flowcharts of the embodiments of the methods described above. Any reference to a memory, storage, database or other media used in the embodiments provided in this application may include nonvolatile and/or volatile memory. The nonvolatile memory may include a read only memory (ROM), a programmable ROM (PROM), an electrically programmable ROM (EPROM), an electrically erasable programmable ROM (EEPROM) or a flash memory. The volatile memory may include a random access memory (RAM) or an external cache memory. By way of illustration but not limitation, RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a memory bus (Rambus) direct RAM (RDRAM), a Direct Rambus Dynamic RAM (DRDRAM) and a Rambus Dynamic RAM (RDRAM).

The technical features of the above-mentioned embodiments can be combined in an arbitrary manner. For simplicity of description, not all of the possible combinations of the technical features in the embodiments described above are described, however, as long as there is no contradiction between these combinations of the technical features, the combinations should be considered as falling within the scope of this specification.

The above-mentioned embodiments only represent several embodiments of this disclosure, and their descriptions are specific and detailed, but they should not be understood as limiting the scope of this disclosure as such. It should be noted that, several modifications and improvements can be made for those of ordinary skill in the field without departing from the concept of this disclosure, which belong to the protection scope of this disclosure. Therefore, the protection scope of this disclosure shall be subjected to the appended claims.

What is claimed is:

1. A method for identifying unknown traffic data based on a dynamic network environment, comprising:

acquiring a network traffic data set to be identified, the network traffic data set including a plurality of known traffic data and/or unknown traffic data, both the known traffic data and the unknown traffic data containing normal traffic data and malicious traffic data;

pre-processing the network traffic data set based on traffic feature ordering to obtain traffic data features in multiple dimensions;

inputting the traffic data features in the multiple dimensions into a known network traffic classification model to predict a class of respective traffic data in the network traffic data set, and outputting respective class prediction result;

performing preliminary determination for unknown traffic data on traffic data corresponding to the class prediction result according to a self-adaptive confidence principle to obtain the unknown traffic data; classifying the unknown traffic data into different classes according to an adaptive clustering method, and initially labeling the unknown traffic data according to the divided classes;

identifying a class of the unknown traffic data according to a similarity coefficient estimation method to obtain classes for malicious traffic and normal traffic in the unknown traffic data, wherein in identifying the class of the unknown traffic data according to the similarity coefficient estimation method to obtain classes for malicious traffic and normal traffic in the unknown traffic data, similarity of the traffic data is estimated by calculating K-L divergence indexes of two types of traffic data features; and training and updating the known network traffic classification model with malicious traffic data and normal traffic data identified in the unknown traffic data as known traffic data, wherein the known network traffic classification model is trained and constantly updated with new known traffic data such that the known network traffic classification model learns and is trained with emerging new network data;

the known network traffic classification model is configured to continuously improve in ability to identify unknown traffic data;

the known network traffic classification model comprises a deep neural network, the deep neural network comprises a convolutional neural network (CNN), the CNN supports learning of data features in different dimensions in a process of training the known network traffic classification model; an integrated classification model for known network traffic Me~$Se_m$re is used to perform prediction on the network traffic data set to be identified, wherein Me~$Se_m$e comprises three parts which respectively use different training feature sets, the three parts comprise a traffic classification subnetwork model $M_n$ using only known normal traffic F $H_n$={1d $H_n$, 2d $H_n$, 3d H} where 1d H, 2d H~, and 3d H, are known normal training features, a traffic classification subnetwork model $M_p$ using only known malicious traffic F $H_p$={1d $H_p$, 2d H, 3d Hr} where 1d $H_p$, 2d Hp, and 3d Hp are known malicious training features, and a traffic classification subnetwork model M, using both the known normal traffic and the known malicious traffic as training features;

each of the three parts comprises CNN models in three dimensions, and sample probabilities of respective Softmax layers of the three CNN models are fused by a decision information fusion layer;

an optimal feature pre-processing strategy selected in a process of training the integrated classification model for the known traffic is used to pre-process the traffic data to obtain one-dimensional features, two-dimensional features and three-dimensional features, and the known normal traffic classification model Mn, the known malicious traffic classification model $M_p$ and the known traffic classification model M, are used to perform prediction on the one-dimensional features, the two-dimensional features and the three-dimensional features respectively;

based on characteristics of the deep neural network classification model with high prediction confidence for trained samples and low prediction confidence for unknown samples, the known network traffic classification model is used to perform prediction on the network traffic data set; and an adaptive confidence threshold e is set, and unknown network traffic data with low confidence of the sample prediction class results is screened out from mixed network packets, thus preliminary determination for the unknown traffic data is made for corresponding traffic data according to the class prediction result, and thereby identifying malicious traffic from the unknown traffic data with enhanced accuracy.

2. The method for identifying the unknown traffic data according to claim 1, wherein training the known network traffic classification model before using the known network traffic classification model to predict the class of the respective traffic data in the network traffic data set comprises:

acquiring a known traffic data training set, the known traffic data training set including known normal traffic data, known malicious traffic data and mixed traffic data of known normal traffic data and known malicious traffic data; and pre-processing respective known traffic training data and inputting it into the known network traffic classification model respectively for training until the known network traffic classification model has an ability to classify the known traffic data, the known network traffic classification model including three traffic classification subnetworks which are trained with the known normal traffic data, the known malicious traffic data and the mixed traffic data, respectively.

3. The method for identifying the unknown traffic data according to claim 2, wherein each of the traffic classification subnetworks comprises a one-dimensional depth neural network, a two-dimensional depth neural network, a three-dimensional depth neural network and a decision information fusion layer;
  the known traffic training data is pre-processed to obtain one-dimensional vector data, two-dimensional vector data and three-dimensional vector data corresponding to the respective known traffic training data; and
  in training respective traffic classification subnetworks, the one-dimensional vector data, the two-dimensional vector data and the three-dimensional vector data corresponding to the known traffic training data are input into the one-dimensional depth neural network, the two-dimensional depth neural network and the three-dimensional depth neural network correspondingly for feature extraction, and respectively extracted features are input into the decision information fusion layer for fusion, and the class prediction result of the known traffic training data is output.

4. The method for identifying the unknown traffic data according to claim 3, wherein,
  the one-dimensional depth neural network, the two-dimensional depth neural network and the three-dimensional depth neural network each comprises a ReLU function, a fully connected layer and a Softmax output layer behind each of convolution layers; and
  the decision information fusion layer fuses output results of three depth neural networks with different dimensions.

5. The method for identifying the unknown traffic data according to claim 1, wherein performing the preliminary determination for unknown traffic data on the traffic data corresponding to the class prediction result according to the self-adaptive confidence principle to obtain the unknown traffic data comprises:
  determining that the traffic data corresponding to the class prediction result is the unknown traffic data if the class prediction result is less than a confidence threshold;
  determining that the traffic data corresponding to the class prediction result is the known traffic data if the class prediction result is greater than or equal to the confidence threshold; and
  determining a preset number of traffic data with a lowest class prediction result as the unknown traffic data when traffic data in the network traffic data set a number of which exceeds the preset number is preliminarily determined as unknown traffic data.

6. The method for identifying the unknown traffic data according to claim 5, wherein in performing the preliminary determination for unknown traffic data according to the class prediction result and the confidence threshold,
  an initial value of the adaptive confidence threshold is a preset value, and when traffic data in the network traffic data a number of which is less than the preset number is preliminarily determined as unknown traffic data, the preset value is increased by a factor of (1+a), where a is a preset parameter.

7. The method for identifying the unknown traffic data according to claim 1, wherein classifying the unknown traffic data into different classes according to an adaptive clustering method, and initially labeling the unknown traffic data according to the divided classes comprises:
  performing feature dimension reduction on the unknown traffic data using a principle component analysis method; and
  clustering the unknown traffic data after the dimension reduction to obtain a class label of the unknown traffic data.

8. The method for identifying the unknown traffic data according to claim 1, wherein pre-processing of the data based on the traffic feature ordering is made using four processing methods: a sequential method, a random sampling method, a load descending method and a load ascending method.

9. A device including a processor and a memory for identifying unknown traffic data based on a dynamic network environment, comprising: a network traffic data set acquisition module configured for acquiring a network traffic data set to be identified, the network traffic data set including a plurality of known traffic data and/or unknown traffic data, both the known traffic data and the unknown traffic data containing normal traffic data and malicious traffic data;
  a network traffic data set pre-processing module configured for pre-processing the network traffic data set based on traffic feature ordering to obtain traffic data features in multiple dimensions;
  a known traffic data class prediction module configured for inputting the traffic data features in the multiple dimensions into a known network traffic classification model to predict a class of respective traffic data in the network traffic data set, and outputting respective class prediction result;
  an unknown traffic data preliminary determination module configured for performing preliminary determination for unknown traffic data on traffic data corresponding to the class prediction result according to a self-adaptive confidence principle to obtain the unknown traffic data;
  an unknown traffic data class labeling module configured for classifying the unknown traffic data into different classes according to an adaptive clustering method, and initially labeling the unknown traffic data according to the divided classes;
  a malicious traffic class identification module configured for identifying a class of the unknown traffic data according to a similarity coefficient estimation method to obtain classes for malicious traffic and normal traffic in the unknown traffic data, wherein in identifying the class of the unknown traffic data according to the similarity coefficient estimation method to obtain classes for malicious traffic and normal traffic in the unknown traffic data, similarity of the traffic data is estimated by calculating K-L divergence indexes of two types of traffic data features; and
  a known-network-traffic-classification model training and updating module configured for training and updating the known network traffic classification model with malicious traffic data and normal traffic data identified in the unknown traffic data as known traffic data, wherein the known network traffic classification model is trained and constantly updated with new known traffic data such that the known network traffic classification model learns and is trained with emerging new network data; the known network traffic classification model is configured to continuously improve in ability to identify unknown traffic data; the known network traffic classification model comprises a deep neural network, the deep neural network comprises a convolutional neural network (CNN), the CNN supports learning of data features in different dimensions in a process of training the known network traffic classification model;

an integrated classification model for known network traffic $Mense_{mle}$ is used to perform prediction on the network traffic data set to be identified, wherein $Mensem_{le}$ comprises three parts which respectively use different training feature sets, the three parts comprise a traffic classification subnetwork model $M_n$ using only known normal traffic F $H_n=\{1d\ H_n, 2d\ H, 3d\ H\}$ where 1d H, 2d H, and 3d H, are known normal training features, a traffic classification subnetwork model $M_p$ using only known malicious traffic F $H_p=\{1d\ H_p, 2d\ H_p, 3d\ H_p\}$ where 1d Hp, 2d Hp, and 3d Hp are known malicious training features, and a traffic classification subnetwork model $M_m$ using both the known normal traffic and the known malicious traffic as training features; each of the three parts comprises CNN models in three dimensions, and sample probabilities of respective Softmax layers of the three CNN models are fused by a decision information fusion layer;

an optimal feature pre-processing strategy selected in a process of training the integrated classification model for the known traffic is used to pre-process the traffic data to obtain one-dimensional features, two-dimensional features and three-dimensional features, and the known normal traffic classification model Mn, the known malicious traffic classification model $M_p$ and the known traffic classification model M, are used to perform prediction on the one-dimensional features, the two-dimensional features and the three-dimensional features respectively;

based on characteristics of the deep neural network classification model with high prediction confidence for trained samples and low prediction confidence for unknown samples, the known network traffic classification model is used to perform prediction on the network traffic data set; and an adaptive confidence threshold e is set, and unknown network traffic data with low confidence of the sample prediction class results is screened out from mixed network packets;

thus preliminary determination for the unknown traffic data is made for corresponding traffic data according to the class prediction result, thereby identifying malicious traffic from the unknown traffic data with enhanced accuracy.

* * * * *